C. H. SMITH.
SAFETY RELIEF VALVE FOR HOT WATER SYSTEMS.
APPLICATION FILED APR. 13, 1921.

1,401,002.

Patented Dec. 20, 1921.

INVENTOR
Charles H. Smith

UNITED STATES PATENT OFFICE.

CHARLES H. SMITH, OF BOSTON, MASSACHUSETTS.

SAFETY RELIEF-VALVE FOR HOT-WATER SYSTEMS.

1,401,002.  Specification of Letters Patent.  Patented Dec. 20, 1921.

Application filed April 13, 1921. Serial No. 461,010.

*To all whom it may concern:*

Be it known that I, CHARLES H. SMITH, a citizen of the United States, residing at Boston, in the county of Suffolk and State of Massachusetts, have invented new and useful Improvements in Safety Relief-Valves for Hot-Water Systems, of which the following is a specification.

This invention relates to safety devices to be used in connection with hot water systems such as are ordinarily found in residences, for the purpose of preventing explosions due to excessive pressure or heat. While not limited to such use this invention is particularly desirable in connection with such systems where the water is under some pressure as from a public water supply, in which case no steam may be formed even though the temperature of the system may have risen to a dangerous point. In such cases it is desirable, not only that excessive pressure should be relieved but that relief at a lower pressure should be provided whenever the temperature is excessive, since under certain conditions, excessive temperature may result in sudden pressure increase of too violent a nature to admit of successful handling by the usual pressure relief.

This invention provides a pressure relief valve and in connection therewith a pair of fusible plugs, preferably of differing degrees of fusibility, one of which is held in the end of a pipe projecting down well within the water in the system, as for example, in the boiler, and normally closes a port leading through the pressure valve, and the other of which closes a port leading to an exhaust pipe from a point below the valve seat. Both ports are so positioned as to be readily accessible for replugging in case the plugs should have been melted out.

For a more complete understanding of this invention together with other objects and advantageous details and combinations of parts, reference may be had to the accompanying drawings in which—

Figure 1:
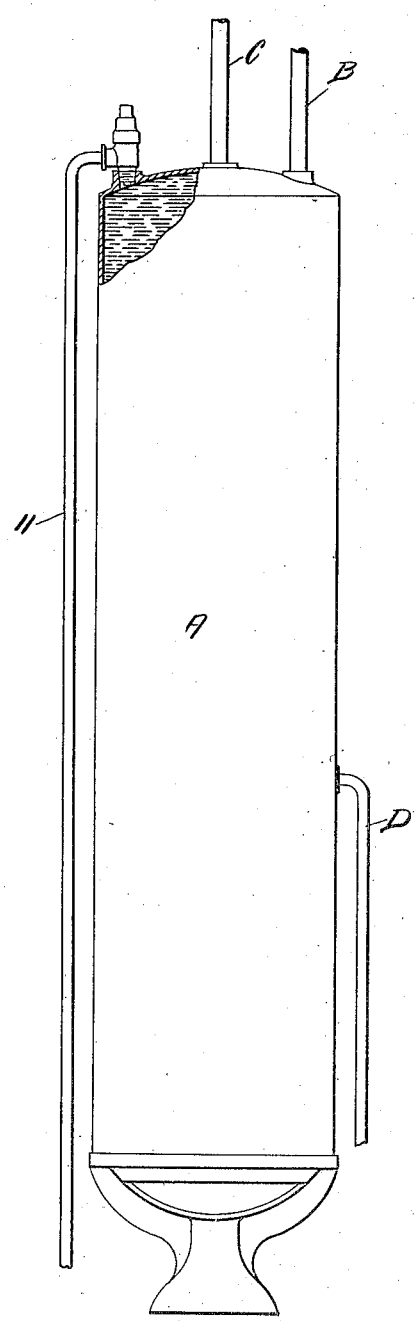
Figure 1 is an elevation partly broken away of a domestic hot water tank or boiler equipped with the device of this invention.
Figure 2:
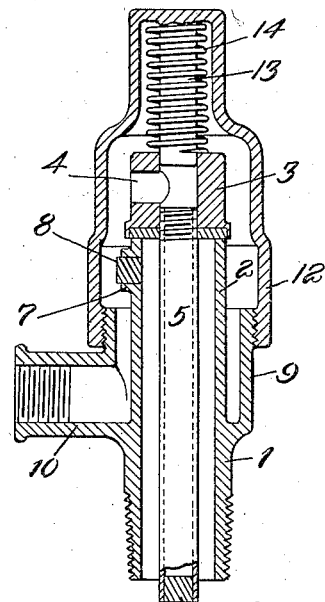
Fig. 2 is a vertical cross section through the device itself.

Referring to the drawings, A represents the usual boiler or hot water tank having inlet and outlet pipes B and C and a pipe D leading to a hot water heater of any suitable description, such as the water back or coil in a kitchen range or a gas heater. At the top of the boiler or tank may be positioned the relief valve which will now be described.

This valve comprises a casing 1, screw threaded at its lower end for insertion in the top plate of the tank and having projecting upwardly therein a tubular portion 2. The upper end of this tubular portion is formed as a valve seat for the reception of a pressure valve 3. This valve has a port 4 through the side thereof which communicates with the upper end of a pipe 5 threaded in the lower face of valve 3, this pipe extending downwardly within the tube 2 and the lower end thereof projecting well within the water of the tank. At its lower end a plug 6 of fusible metal is inserted to normally close communication through the pipe and valve. Beneath the upper end of the tube 2 a port 7 is formed through its side wall, this port being normally closed by a fusible plug 8 preferably melting at a higher temperature than the plug 6. Integral with the casing 1 is an upwardly extending flange 9, spaced from the tube 2 to form a passage way opening into a laterally extending nipple 10, which may be connected to an exhaust pipe 11. The upper end of the portion 9 is threaded to receive the lower end of a threaded cap 12 which houses the upper end of the tube 2 and the valve 3. Depending from the top of the cap a post 13 extends within a guide opening in the valve 3 and furnishes a support for a coil spring 14 bearing at its upper end against the top of the cap and at its lower end against the top of the valve 3. By turning the cap 12 the pressure of the spring 14 on the valve 3 may be adjusted as desired.

It is evident that in operation should the pressure within the tank rise to a point sufficient to overcome the pressure of the spring 14, the valve 3 will be lifted from its seat against the end of the tube 2 and relieve the pressure through the exhaust port and the pipe 11. Should the pressure not become sufficient to overcome the pressure of the spring 14, but should the temperature of the water rise to sufficient degree, the fusible plug 6 will melt, thereupon allowing the pressure in the system to be relieved through the pipe 5 and the port 4 to the exhaust. Should this latter action have taken place and the lower end of pipe 5 have been replugged, due either to ignorance or carelessness on the part of the plumber, with solder or other material having too high a fusing point to render the device operative under excessive temperature, the plug 8 in the upper part of the tube 2 will melt and afford an additional means for relieving the pressure under abnormal heating conditions. Plug 8 is preferably of metal having a higher fusing temperature than plug 6 so that normally plug 6 will give way without affecting the plug 8. One side of each plug is always in direct contact with the water in the system. By removing cap 12 the valve 3, together with the pipe, may be removed readily for the purpose of inserting a new plug in the end of the pipe. Port 7, also, is in a position readily accessible to the repair man so that should plug 8 have been melted a new plug may be inserted without the necessity of further disassembling the parts.

Having thus described one embodiment of this invention it should be evident to those skilled in the art that many changes and modifications might be made therein without departing from its spirit or scope as defined by the appended claims.

I claim:

1. A device of the class described comprising a tube having means at its lower end for connecting it to a tank and having a port through the side thereof, a valve seated on the upper end of said tube and having a port therethrough, a pipe connected to said valve in communication with said valve port and extended downward within said tube, a fusible plug closing the lower end of said pipe, and a fusible plug closing the port in said tube.

2. A device of the class described comprising a tube in communication with water in a tank, a pressure valve controlling the outlet from one end of said tube, and a fusible plug closing an opening through the side of said tube.

3. A device of the class described comprising an open ended casing attachable at one end to a water supply, a tube in said casing leading from said end thereof, an exhaust connection leading into said casing about said tube, a valve seated on the free end of said tube, a cap for the opposite end of said casing and inclosing said valve and tube, a spring bearing between said cap and valve to retain the valve seated, and a fusible plug closing a passage through said tube to said exhaust connection.

4. A device of the class described comprising an open ended casing attachable at one end to a water supply, a tube in said casing leading from said end thereof, an exhaust connection leading into said casing about said tube, a valve seated on the free end of said tube and having a port therein, a pipe fixed to said valve in communication with said port and extending through said tube, a fusible plug closing the free end of said pipe, a cap for the opposite end of said casing and inclosing said valve and tube, a spring bearing between said cap and valve to retain the valve seated, and a fusible plug closing a passage through said tube to said exhaust connection.

5. A device of the class described comprising a casing attachable to a water supply, said casing having an inlet port, an outlet port, and a valve seat between said ports, a valve normally engaging said seat for closing communication between said ports and having a port therethrough, means normally closing said valve port, and a fusible plug for closing a connection between said ports independent of said valve.

6. A device of the class described comprising an open ended casing attachable to a water supply, said casing having an inlet port, an outlet port, a valve seat between said ports, and a passage way connecting said ports, a valve normally engaging said seat for closing communication between said ports and having a port therethrough, a fusible plug normally closing said valve port, a fusible plug for closing said passage way, and a cap for closing the open end of said casing and removable to expose said valve and said plug to ready access.

7. A device of the class described comprising a casing having inlet and outlet ports and a pair of passages therethrough connecting said ports, a valve having a port therethrough for controlling one of said passages, a fusible plug closing the other of said passages, and a fusible plug closing said valve port.

8. A device of the class described comprising a casing for connection to a water supply and having inlet and outlet ports and a pair of passages therethrough connecting said ports, a valve having a port therethrough for controlling one of said passages, a fusible plug closing the other of said passages, and a fusible plug closing said valve port, both of said plugs being in contact with the water of said supply.

In testimony whereof I have affixed my signature.

CHARLES H. SMITH.